US 8,430,567 B2

(12) United States Patent
Lobbezoo (10) Patent No.: US 8,430,567 B2
(45) Date of Patent: Apr. 30, 2013

(54) LOAD ADAPTIVE ROLLER CARRIAGE ASSEMBLY

(75) Inventor: Edward A. Lobbezoo, Hudsonville, MI (US)

(73) Assignee: Knape & Vogt Manufacturing Company, Grand Rapids, MI (US)

( * ) Notice: Subject to any disclaimer, the term of this patent is extended or adjusted under 35 U.S.C. 154(b) by 407 days.

(21) Appl. No.: 12/869,512

(22) Filed: Aug. 26, 2010

(65) Prior Publication Data
US 2012/0049712 A1 Mar. 1, 2012

(51) Int. Cl.
*A47B 88/00* (2006.01)
*A47B 88/04* (2006.01)
*A47B 88/10* (2006.01)
*F16C 29/04* (2006.01)

(52) U.S. Cl.
USPC .............. 384/19; 384/7; 384/18; 312/334.12; 312/337.26

(58) Field of Classification Search .............. 384/18–21, 384/51, 7; 312/334.11–334.114, 330.01, 312/349, 334.19, 334.26; 104/162, 176; 16/82, 86, 87, 101
See application file for complete search history.

(56) References Cited

U.S. PATENT DOCUMENTS

| | | | | |
|---|---|---|---|---|
| 2,031,251 | A | * | 2/1936 | Clark ....................... 312/334.13 |
| 2,692,802 | A | | 10/1954 | Kurtzon et al. |
| 2,726,915 | A | | 12/1955 | Schuette |
| 3,460,876 | A | | 8/1969 | De Boer |
| 3,904,254 | A | * | 9/1975 | Hagen et al. ................... 384/18 |
| 4,057,303 | A | * | 11/1977 | Rock et al. ....................... 384/19 |
| 4,089,567 | A | * | 5/1978 | Rock et al. ....................... 384/19 |
| 4,162,114 | A | | 7/1979 | Litchfield et al. |
| 4,227,750 | A | * | 10/1980 | Rock et al. ....................... 384/18 |
| 4,298,234 | A | | 11/1981 | Litchfield et al. |
| 4,304,449 | A | | 12/1981 | Litchfield et al. |
| 4,370,007 | A | * | 1/1983 | Fler .......................... 312/334.11 |
| 4,458,964 | A | * | 7/1984 | Hardy ...................... 312/334.12 |
| 4,482,066 | A | | 11/1984 | Dykstra |
| 4,508,394 | A | * | 4/1985 | Rock ............................... 384/19 |
| 4,633,615 | A | | 1/1987 | Moose |
| 4,659,237 | A | * | 4/1987 | Rapp .............................. 384/19 |
| 4,952,074 | A | | 8/1990 | Röck |
| 5,090,171 | A | | 2/1992 | Kano et al. |
| 5,364,179 | A | * | 11/1994 | Brustle et al. ................. 312/333 |
| 6,478,393 | B2 | | 11/2002 | Kim et al. |
| 7,597,413 | B2 | | 10/2009 | Fitz |
| 2005/0231083 | A1 | | 10/2005 | Garcie, Jr. |

FOREIGN PATENT DOCUMENTS

| | | |
|---|---|---|
| AT | 397 606 B | 5/1994 |
| AT | 004 518 U1 | 8/2001 |
| DE | 27 31 953 A1 | 1/1978 |
| DE | 43 28 459 A1 | 5/1995 |

(Continued)

OTHER PUBLICATIONS

International Search Report for PCT/US2011/045465 dated Jan. 27, 2012.

(Continued)

*Primary Examiner* — Marcus Charles
(74) *Attorney, Agent, or Firm* — Cook Alex Ltd.

(57) ABSTRACT

A load adaptive roller carriage assembly for use with a slide assembly where the roller carriage assembly is configured to provide auxiliary load support. The load adaptive roller carriage assembly includes a carriage, at least two rollers rotatably connected to the carriage, and the carriage is configured to permit each roller to move independently relative to each other roller.

24 Claims, 6 Drawing Sheets

FOREIGN PATENT DOCUMENTS

| | | |
|---|---|---|
| DE | 296 16 756 U1 | 1/1997 |
| DE | 197 18 256 A1 | 11/1998 |
| EP | 0 523 428 A1 | 1/1993 |
| EP | 0 820 712 A2 | 1/1998 |
| GB | 1291463 A | 10/1972 |
| GB | 1604811 | 4/1977 |
| GB | 2093334 A | 9/1982 |

OTHER PUBLICATIONS

Written Opinion of the international Searching Authority for PCT/US2011/045465 dated Jan. 27, 2012.

* cited by examiner

LOAD ADAPTIVE ROLLER CARRIAGE ASSEMBLY

FIELD OF THE DISCLOSURE

This disclosure generally relates to roller carriages for use with slide members in slide assemblies. Such slide assemblies tend to be used in articles of furniture, such as cabinets, for assisting in supporting the load of a drawer when moving the drawer to a fully closed position within a cabinet or to a position with the drawer extended from a cabinet. The slide assemblies often are referred to as drawer slides, and this disclosure more particularly relates to a roller carriage assembly that is capable of adapting to the loading conditions on a slide assembly to provide auxiliary support to assist the bearing elements that are located between the slide members.

BACKGROUND

Slide assemblies having slide members and bearings can provide slidable translation of one body relative to another. Slide assemblies are very commonly found in articles of furniture, such as cabinets having drawers. In such constructions, the slide assemblies also may be referred to as drawer slides and they are intended for mounting a drawer to a cabinet and for providing a way to move the drawer between a fully closed position within the cabinet to an open position with the drawer extending outward from the cabinet. Standard slide assemblies tend to be mounted in pairs, with one on each of the left and right outer sides of the drawer, or in an undermount format beneath and along respective outer left and right edges of the drawer. In such configurations, on each side of the drawer, a first slide member is attached to the cabinet and a second slide member is attached to the drawer. Bearings, such as ball, roller, or other friction reducing elements typically are disposed between the slide members for smooth movement of the drawer relative to the cabinet. The bearings may be organized and located within bearing retainers that may be mounted to one or more of the slide members, or may be permitted to move with respect to the slide members. Also, there may be a third slide member coupled to and between the first and second slide members, in which case there are bearings between the respective slide members to permit further telescopic extension of the first slide member relative to the second slide member.

In slide assembly configurations, it is possible that a drawer front will not maintain appropriate alignment with other cabinet features, such as adjacent drawers or doors, if the drawer to which the drawer front is affixed is subjected to a large load when in a closed position. Thus, depending on the extent of the load and its position toward the front of a drawer, a second slide member may tend to tip downward at its front relative to the respective first slide member. This may occur when the drawer is fully retracted and within the cabinet, leading to unsightly alignment or interference issues for the drawer front and to excessive loading on the bearings that otherwise would be supporting the front portion of the drawer. The large load also may cause alignment and clearance issues within the slide assembly when at or near the closed position.

While there exist roller assemblies that provide a pair of rollers near the front of the second slide member when a drawer is in a closed position to carry some of the load that would otherwise be on the slide assembly bearings, such roller assemblies either provide rollers on axles that are fixed in place, or provide rollers on axles that are mounted to a rocker member that is pivotally mounted. Unfortunately, rollers mounted in a fixed position are susceptible to overloading of one roller relative to the other and may provide an on or off feeling when engaging or disengaging the rollers. The rollers mounted to a pivotal rocker member lessen some of the negative affects of the fixed rollers, but unfortunately place all of the load on the single pivot provided to permit the tilting of the pivotal member to which the axles are mounted, with the pivot at a fixed position relative to a first slide member. Also, the use of a rocker member results in all of the inputs to one of the rollers being transmitted directly to the other roller, such that as one roller is moved downward, the rocker member tilts and the other roller is moved upward, with the single pivot still being subjected to all of the load.

It would be desirable to provide load adaptive roller carriage assemblies for use with a slide assembly where a roller carriage assembly can provide auxiliary load support near the front of the slide assembly to help control drawer front alignment and slide member clearances when a drawer is closed or nearly closed and is subjected to higher loads near the front of the drawer, and to provide auxiliary load support to the bearings disposed between the slide members when the drawer is at and/or near a closed position. It also would be desirable to provide such load adaptive roller carriage assemblies with independent adaptive movement of each of the rollers based on the loading conditions on the slide assembly.

BRIEF DESCRIPTION OF THE DRAWINGS

In describing the example load adaptive roller carriage assembly disclosed herein, reference is made to the accompanying drawings wherein like parts have like reference numerals, and wherein.

It should be understood that the drawings are not to scale and that actual embodiments may differ. It also should be understood that the claims are not limited to the particular preferred embodiment illustrated, but rather cover various configurations of load adaptive roller carriage assemblies and devices using the same.

SUMMARY

The present disclosure provides an example load adaptive roller carriage assembly for use in slide assemblies to provide auxiliary loading capacity between slide members and wherein the carriage assembly permits independent movement of the rollers. Instead of providing fixed rollers or rollers that are mounted to a rocker member to assist in carrying excessive loads at the front of a slide assembly, the disclosed example load adaptive roller carriage assembly is configured to allow each of two rollers to act independently in providing auxiliary load support. Hence, the present disclosure addresses shortcomings in prior art roller carriage assemblies, while providing for adaptive auxiliary loading in a quiet, smooth-operating assembly for use in a slide assembly, such as a drawer slide.

In a first aspect, a load adaptive roller carriage assembly is provided for use with a slide member of a slide assembly where the load adaptive roller carriage assembly includes a carriage, at least two rollers rotatably connected to the carriage, and the carriage is configured to permit each roller to move downward independently relative to each other roller.

In another aspect, a load adaptive roller assembly is provided for use with a slide assembly that comprises a first slide member configured for mounting to a cabinet, a second slide member configured for mounting to a drawer and a third slide member configured for slidable movement between and with respect to the first and second slide members. The roller carriage assembly includes a carriage, at least two rollers rotatably connected to the carriage and disposed below a second slide member, and the carriage is configured to allow engagement of the rollers with a second slide member and independent displacement of each roller depending on the load carried by the second slide member relative to the first slide member.

In a further aspect, the disclosure provides a load adaptive roller carriage assembly for use with a slide member of a slide assembly, the load adaptive roller carriage assembly including a carriage having a base and at least two axle mounts connected to the base, at least two rollers with each roller rotatably connected to an axle, each axle being connected to an axle mount, and the axle mounts being configured to be independently movable relative to the base.

It is to be understood that both the foregoing general description and the following detailed description are exemplary and provided for purposes of explanation only, and are not restrictive of the disclosure, as claimed. Further features and objects of the present disclosure will become more fully apparent in the following description of an example embodiment and from the appended claims.

DETAILED DESCRIPTION

Although the following discloses an example load adaptive roller carriage assembly for use in slide assemblies, such as drawer slides, persons of ordinary skill in the art will appreciate that the teachings of this disclosure are in no way limited to the example embodiment. On the contrary, it is contemplated that the teachings of this disclosure may be implemented in alternative configurations and environments. In addition, although the example load adaptive roller carriage assembly described herein is shown in conjunction with a particular configuration of a slide assembly, those having ordinary skill in the art will readily recognize that the teachings of the disclosure herein may be used in alternative slide assemblies, for example whether such is a drawer slide of a side mount or undermount construction, or may be mounted independently of a slide assembly, if configured accordingly.

Referring to FIGS. 1-11, it will be appreciated that a load adaptive roller carriage assembly 10 is provided in an environment for use with a slide assembly 100. The slide assembly 100 that is shown is in the form of an undermount drawer slide. The slide assembly 100 includes a first slide member 110, a second slide member 130, and a third slide member 150 that slidably engages both the first slide member 110 and the second slide member 130. The slide members 110, 130 and 150 are preferably made of a strong, rigid material, such as metal or the like, and preferably are made of steel.

Figure 1:
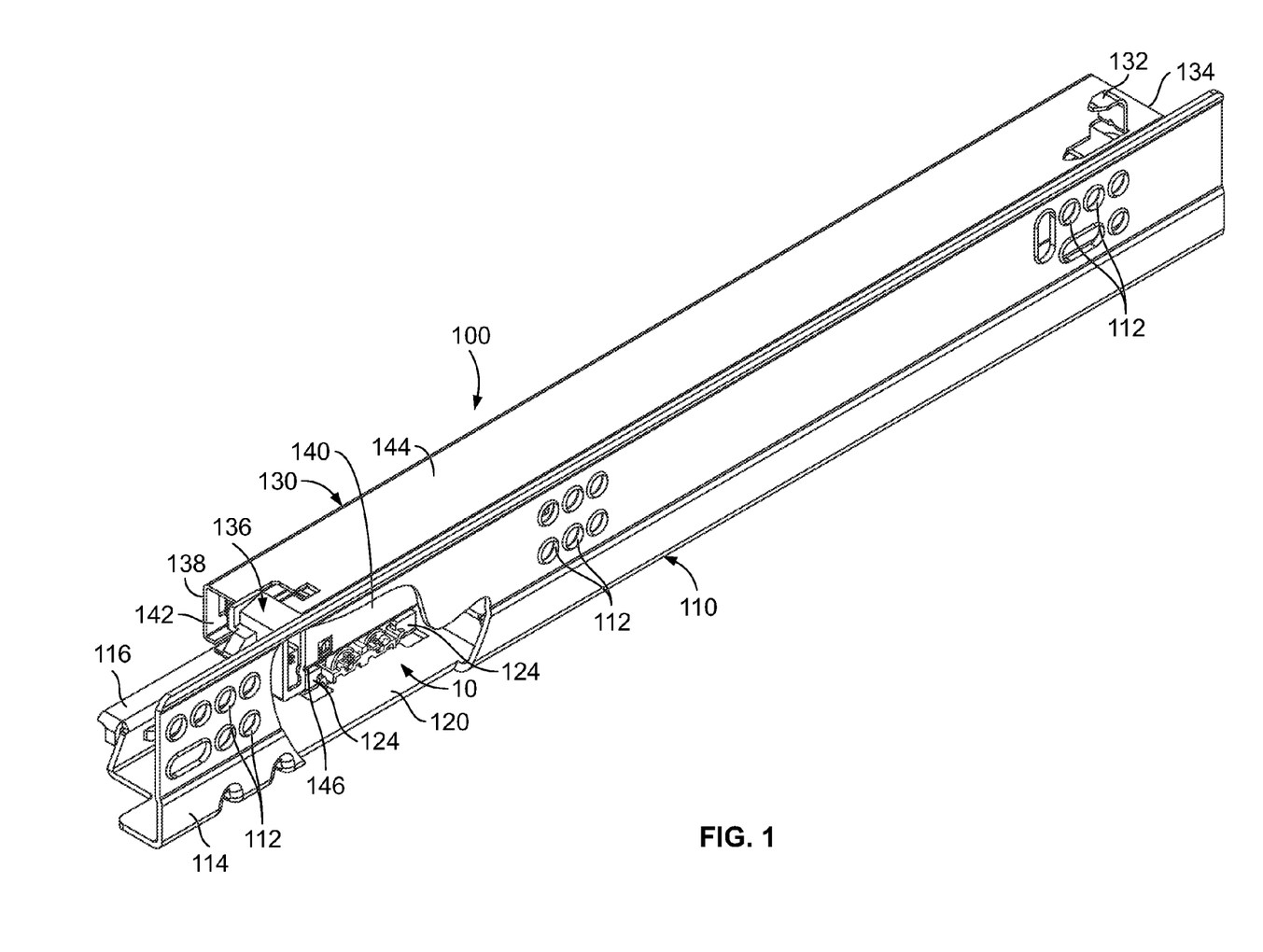
FIG. 1 is a top perspective view of a slide assembly including a load adaptive roller carriage assembly, with the slide assembly in a retracted, closed position and having a cutaway in the upstanding side wall of the first slide member for better viewing of the load adaptive roller carriage assembly.
Figure 2:
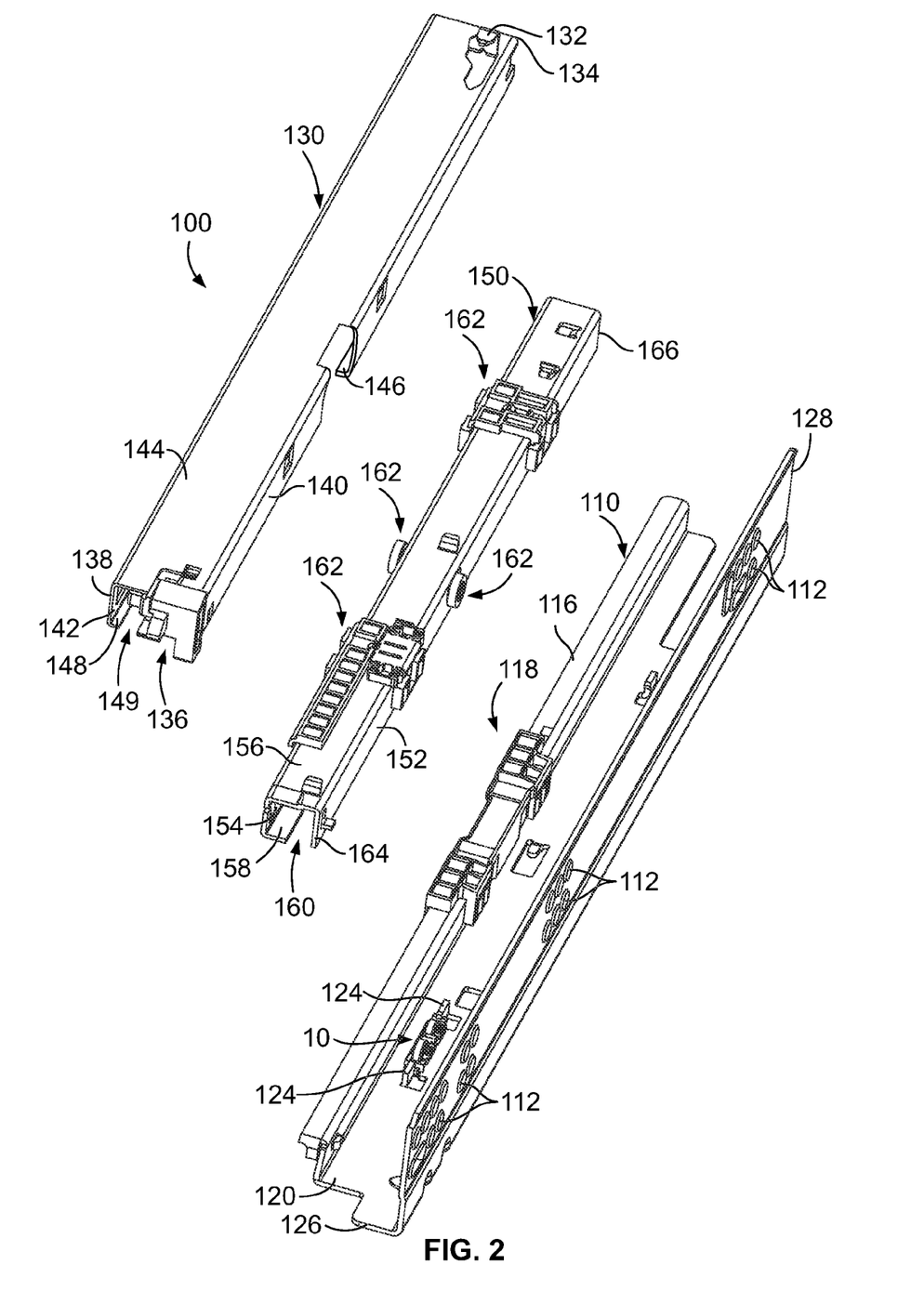
FIG. 2 is a top perspective exploded view of the slide assembly of FIG. 1.
Figure 3:
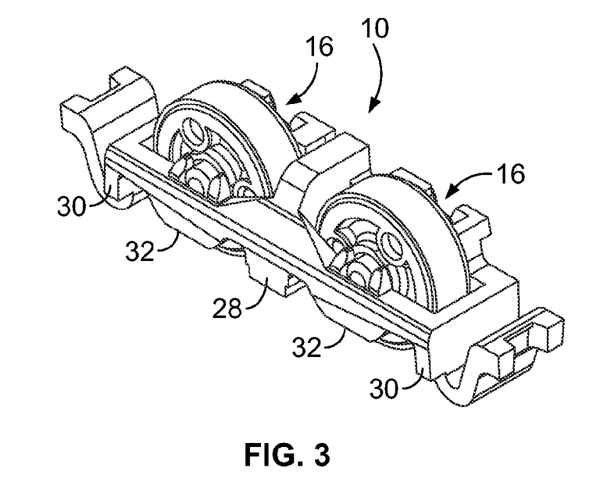
FIG. 3 is a top perspective view of the load adaptive roller carriage assembly used in the slide assembly of FIG. 1.
Figure 4:
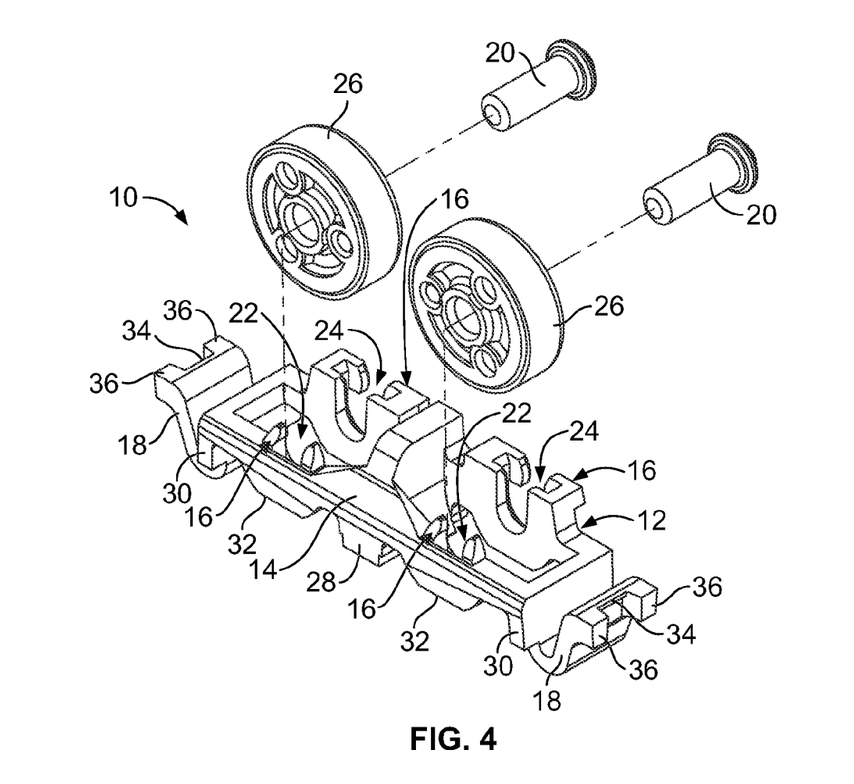
FIG. 4 is a top perspective exploded view of the load adaptive roller carriage assembly shown in FIG. 3.
Figure 5:
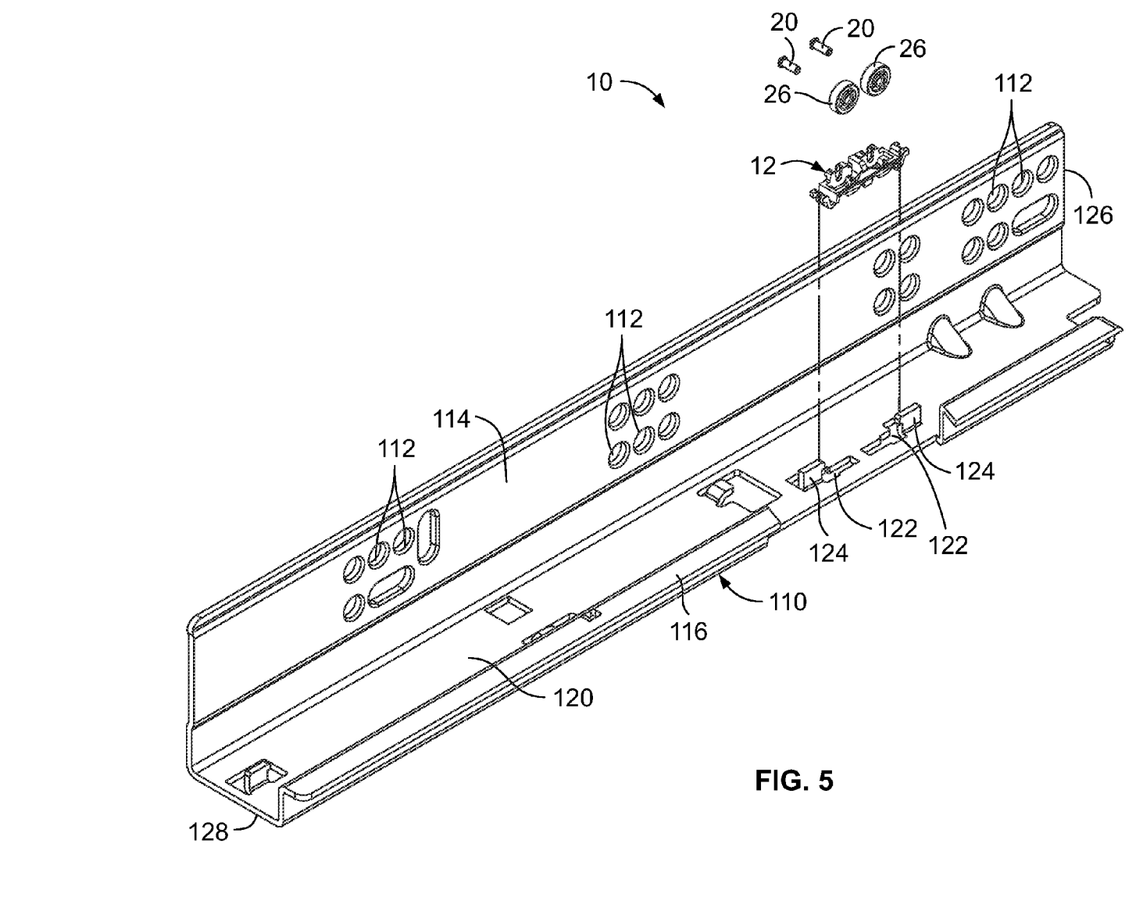
FIG. 5 is a top perspective exploded top view of the load adaptive roller carriage assembly and showing its mounting location and structures relative to the first slide member used in the slide assembly of FIG. 1, with a portion of the bearing rail removed for better viewing of the load adaptive roller carriage assembly.

The first slide member 110 of this example is configured for mounting to the interior of a cabinet (not shown), such as via fastener mounting holes 112 in an upstanding side wall 114, and common fasteners, such as screws (not shown). As best seen in FIG. 2, a bearing rail 116 is located opposite the upstanding side wall 114 and a first bearing assembly 118 is connected to the bearing rail 116 to slidably receive the third slide member 150 on the first slide member 110. The bearing assembly 118 may be constructed with a body made of plastic or metal and includes openings to receive bearing elements such as rollers or ball bearings that may be made of metal or plastic. The first slide member 110 further includes a web 120 between the upstanding side wall 114 and the bearing rail 116. In a common undermount drawer slide mounting position, the web 120 will be substantially horizontal. As best seen in FIG. 5, the web 120 also includes openings 122 and upstanding tabs 124 proximate a front end 126 of the first slide member 110 for receipt and mounting of the roller carriage assembly 10, and the rear end 128 of the first slide member 110 will be mounted within the cabinet via further fastener mounting holes 112.

The second slide member 130 is configured for mounting to the bottom of a drawer (not shown), such as via an upstanding drawer retention tab 132 proximate the rear end 134 of the second slide member 130 and a stop block 136 proximate the front end 138 of the second slide member 130, which is configured to engage a releasable latch assembly on the drawer (not shown). The second slide member 130 includes a first side wall 140, a second side wall 142 and a web therebetween 144. Extending inward toward each other are flanges 146 and 148 at the lower ends of the first and second side walls 140 and 142, respectively, which run along the length of the second slide member 130. These are best seen in FIG. 2 where, for better viewing, the flange 146 is shown in a cutaway along the first side wall 140 of the second slide member 130, and the flange 148 is shown at the front end of the second slide member 130. The second slide member 130 is configured to slidably receive the third slide member 150 within an interior 149 of the second slide member 130. The load adaptive roller carriage assembly 10 is configured to permit engagement of the rollers 26 with the flange 146.

The third slide member 150 includes a first side wall 152, a second side wall 154 and a web therebetween 156. Extending inward from the lower end of the second side wall 154 is a flange 158. The third slide member 150 is configured to slidably receive the bearing rail 116 of the first slide member 110 within an interior 160 of the third slide member 150. The third slide member 150 also has bearing assemblies 162 connected to the web 156 to facilitate slidable movement between the second slide member 130 and the third slide member 150. In this example, the bearing assemblies 162 are connected to the third slide member 150 between a front end 164 and a rear end 166 of the third slide member 150. The bearing assemblies 162 may be constructed in a manner as described above with respect to the bearing assembly 118.

Figure 9:
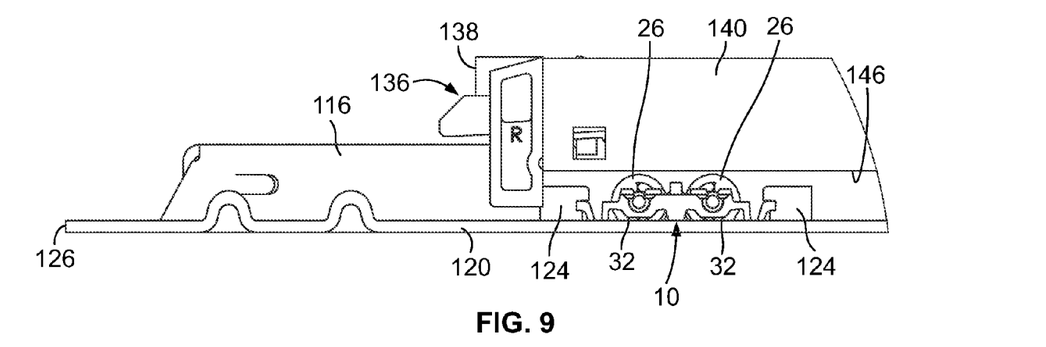
FIG. 9 is a side view of the forward portion of the slide assembly of FIG. 1 when the slide assembly is not subjected to high loading at the front of a slide assembly that is in a closed position, and with the upstanding side wall of the first slide member removed for better viewing of the load adaptive roller carriage assembly.

As can be seen in FIG. 9, the roller carriage assembly 10 is located near the front of the second slide member 130 when the second slide member 130 is in a fully retracted position, such as when a drawer to which it is connected is closed. In this position, it will be appreciated that a drawer front that would be connected to such a drawer must be positioned forward of the front end 126 of the first slide member 110, and thus a heavy load toward the front of such a drawer might cause excessive loading on the slide members, and misalignment of such drawer front relative to the front of the cabinet to which the drawer is mounted and/or poor clearance among components of the slide assembly. The higher forces associated with a large load may even cause damage to a slide member or the bearings. For instance if the bearings include plastic rollers, subjecting them to high loads in the closed position for long periods of time may cause them to develop flat spots due to plastic creep, which may be reduced by the use of a load adaptive roller carriage assembly 10.

As best seen in FIGS. 2-8, the example load adaptive roller carriage assembly 10 includes a carriage 12 that has a base 14, axle mounts 16 and mounting members 18. Each axle mount 16 receives an axle 20 in vertical slots 22 and 24. Each axle 20 also receives for rotatable mounting a roller 26. The axles 20 may be connected to the axle mounts 16 such as by snap fit, or other suitable methods and structures, or they may be connected thereto simply by being held in slots 22, 24 by gravity. The axle mounts 16 are connected to the base 14 in a manner that permits the axle mounts 16 to move independently of each other. In this example, the carriage 12 is constructed of relatively rigid plastic and is integrally molded to include the axle mounts 16 and mounting members 18, while the rollers also are constructed of plastic and the axles are constructed of metal, such as steel. It will be appreciated that alternative carriage, axle and axle mount structures could be provided, whether constructed of plastic, metal or other suitable materials, and whether the axles and axle mounts are separate elements or are combined with each other and/or with the carriage in the manner of integrally formed components.

In this example load adaptive roller carriage assembly 10, the relatively rigid plastic is still somewhat flexible when subjected to loads and hence the axle mounts 16 effectively are resiliently biased upward in their relaxed position relative to the base 14 unless subjected to a load that would cause deflection downward within the carriage 12 with respect to one or both of the axle mounts 16. The base 14 of the carriage 12 includes a relatively broad central leg 28 and outer legs 30. The legs 28 and 30 rest on the web 120 of the first slide member 110 when the roller carriage assembly 10 is mounted to the first slide member 110. When mounted on the legs 28 and 30, if the second slide member 130 is subjected to an excessive load near the front end 138 of the second slide member 130, the flange 146 extending inward from the bottom of the side wall 140 will contact a roller 26. If the load is large enough, the downward force on the roller 26 will cause the axle mount 16 to deflect downward as needed, such as is shown with respect to the righthand roller 26 in FIG. 8, or the lefthand roller 26 in FIG. 11. In this example assembly, the carriage assembly 10 is configured to permit limited downward movement of the rollers 26 by use of a positive stop feature. Thus, deflection will occur up to a point at which a bottom wall 32 of the respective axle mount 16 reaches a positive stop by engaging and coming to rest on the top of the web 120 of the first slide member 110. It will be appreciated that while the downward movement of the rollers 26 is limited by the engagement of the bottom wall 32 with the web 120 of the first slide member 110, the carriage assembly could be configured to permit downward movement of the rollers 26 without including such a positive stop feature.

It will be appreciated that while the example illustrated herein is configured to have the flange 146 on the second slide member 130 spaced slightly above the rollers 26 when the slide assembly 100 is in the closed position and no additional load is present in a drawer to which the slide assembly 100 would be mounted, it would be possible instead to eliminate the slight space above the rollers 26 and have the flange 146 in contact with the top of the rollers at all times. Also, the roller carriage assembly 10 could be configured to have a different preferred spacing between the bottom walls 32 of the axle mounts 16 and the web 120 of the first slide member 110 when at rest and not subject to any increased load, as opposed to the spacing provided in the example of approximately 0.5 mm.

Figure 10:
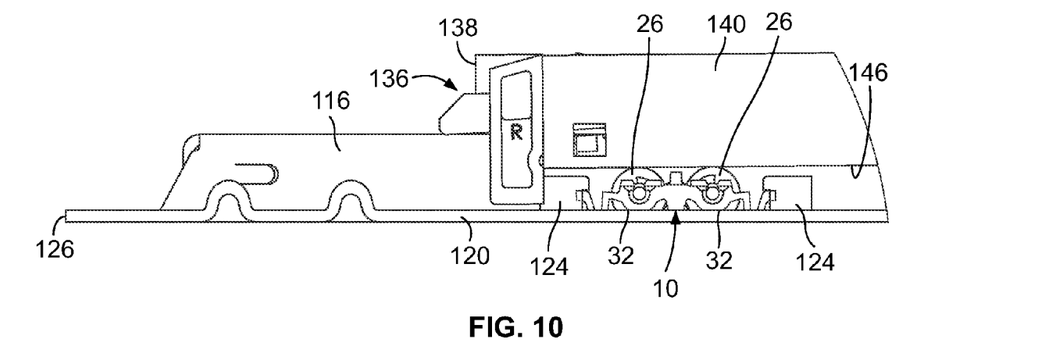
FIG. 10 is a side view of the structures in FIG. 9 but when the slide assembly is subjected to high loading at its front and is in a closed position.
Figure 11:
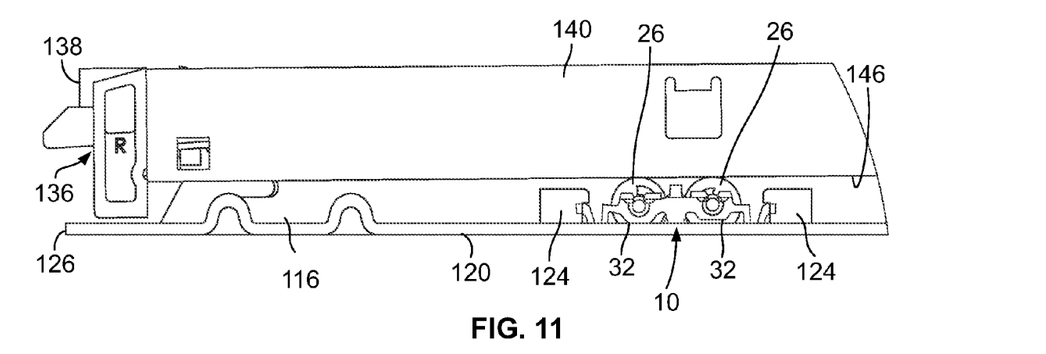
FIG. 11 is a side view of the structures in FIG. 9 but when the slide assembly is subjected to high loading at its front and is in a partially extended position.

A few loading conditions are represented in FIGS. 9-11 to help illustrate some of the relative vertical movements of the rollers 26 and the axle mounts 16 to which they are rotatably connected. For instance, in FIG. 9, the second slide member 130 is in a retracted position and no load is being applied to the rollers 26, such as when a drawer has a very light load near the front end 138 of the second slide member 130. In this view, the rollers 26 are not contacted by the flange 146 of the second slide member 130, nor are the bottom walls 32 of the axle mounts 16 engaging the web 120 of the first slide member 110.

In FIG. 10, the second slide member 130 again is shown in a retracted position, but now the second slide member 130 is subjected to a large downward force, such as when a heavy load is placed in a drawer, especially when near to the drawer front. Such a large downward force often causes misalignment of the drawer front relative to the remainder of the front of the cabinet, as well as clearance issues within the slide assembly that could inhibit smooth operation of the slide assembly. In the view in FIG. 10, both rollers 26 not only are in contact with and serving to provide auxiliary support to the second slide member 130, but the bottom walls 32 of the axle mounts 16 are bottomed out on the web 120 of the first slide member 110. In this position, the rollers 26 may carry some of the load that would otherwise be directed entirely to the bearing assemblies 162.

In FIG. 11, the second slide member 130 has been partially extended, such as when a drawer has been pulled partially out from the cabinet, and in this instance, given the leverage of the extended second slide member 130, an excessive load near the front of the second slide member 130 will tend to cause the drawer to tip downward at the drawer front and will place more stress on the forward most bearings in the bearing assemblies 162. This however is reduced by the auxiliary support provided by the roller carriage assembly 10, which in this instance recognizes a sufficiently excessive load to cause the forward most roller 26 to be loaded to the extent that the bottom wall 32 of its axle mount has come to rest on the top of the web 120 of the first slide member 110. Thus, a portion of the large downward force is diverted and carried by the load adaptive roller carriage assembly 10. If the load was increased sufficiently, the second roller 26 of the roller carriage assembly 10 may independently be forced downward until the bottom wall 32 of its axle mount 16 also engages the top surface of the web 120 of the first slide member 110.

The integral molding of the roller carriage assembly 10 of the illustrated example also results in mounting members 18 that are effectively resiliently biased to a relaxed position. The mounting members 18 may be deflected by squeezing them toward each other in order to obtain a releasable snap fit in slide assembly 100 by inserting the roller carriage assembly 10 between the upstanding tabs 124 on the first slide member 110 and allowing the mounting members 18 to flex outward toward their relaxed position. When released, the mounting members 18 effectively spring outward to trap the carriage 12 in the mounted position by landing a top edge 34 under a protrusion on the upstanding tab 124, while having two extensions 36 straddle the upstanding tab 124. In this manner, the roller carriage assembly 10 is easily mountable to the fixed surface provided by the web 120 of the first slide member 110. The relative rigidity of the mounting members 18 and the engagement of their top edges 34 with the upstanding tabs 124 also causes the carriage assembly 10 to resist upward movement of the base 14 and the axle mounts 16.

Figure 6:
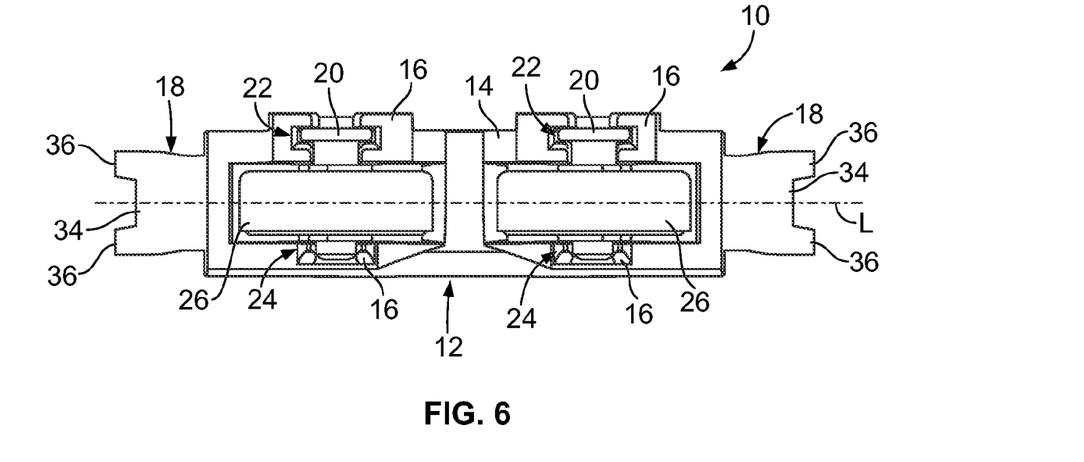
FIG. 6 is a top view of the load adaptive roller carriage assembly shown in FIG. 3.
Figure 7:
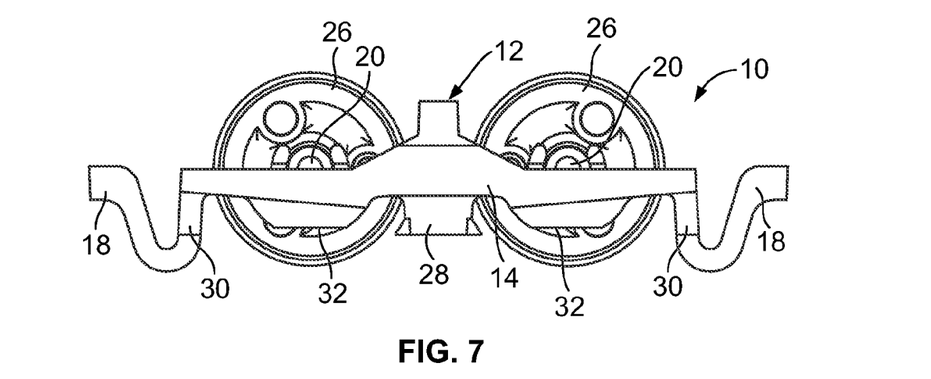
FIG. 7 is a side view of the load adaptive roller carriage assembly shown in FIG. 3.
Figure 8:
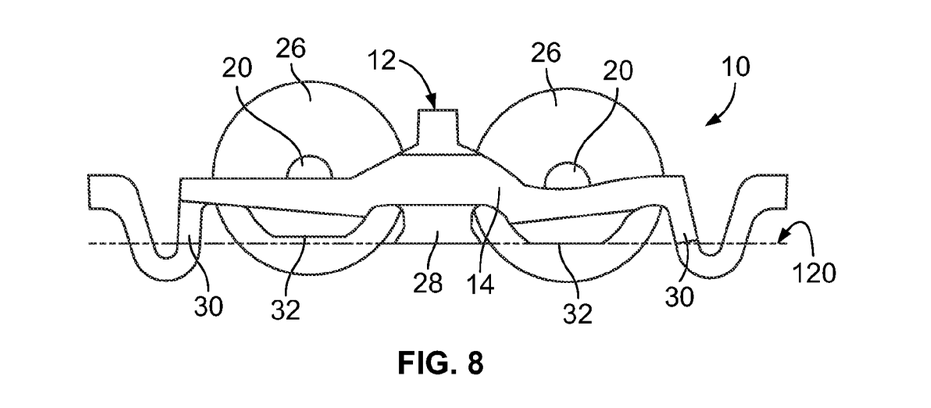
FIG. 8 is a schematic side view of the load adaptive roller carriage assembly shown in FIG. 3 showing potential deflection of the roller carriage assembly.

The axle mounts 16 in the illustrated example also are arranged to center the rollers 26 relative to the mounting members 18, along a common longitudinal axis L, as best seen in FIG. 6. This ensures that regardless of the direction of the roller carriage assembly 10 relative to the first slide member 110 to which it will be installed, the rollers 26 will be consistent in their positioning for alignment with the flange 146 on the second slide member 130. While it will be appreciated that this configuration is evenhanded, allowing a single construction of the roller carriage assembly 10 to be used on both righthand and lefthand slide assemblies and to be installed in either direction, one also will appreciate that this particular configuration need not necessarily be used and roller carriage assemblies utilizing the load adaptive teachings herein could be constructed differently. Thus, it will be appreciated that there may be alternative configurations for the carriage that do not permit universal mounting, and various configurations would be possible for the fixed surface to which a roller carriage assembly will be mounted.

While the present disclosure shows and demonstrates an example load adaptive roller carriage assembly, the example is merely illustrative and is not to be considered limiting. It will be apparent to those of ordinary skill in the art that load adaptive roller carriage assemblies in accordance with the present disclosure may be provided in various configurations and may be constructed to be installed in various forms to interact with slide members of slide assemblies, without departing from the scope or spirit of the present disclosure. Any variety of suitable materials of construction, configurations, shapes and sizes for the components and methods of connecting the components may be utilized to meet the particular needs and requirements of an end user. Thus, although example methods, apparatus and articles of manufacture relating to a load adaptive roller carriage have been described herein, the scope of coverage of this patent is not limited to the preferred example illustrated. On the contrary, this patent covers all methods, apparatus and articles of manufacture fairly falling within the scope of the appended claims either literally or under the doctrine of equivalents.

What is claimed is:

1. A load adaptive roller carriage assembly for use in providing auxiliary vertical support to a slide member of a slide assembly, the load adaptive roller carriage assembly comprising:
    a carriage having a base and at least two axle mounts that extend vertically from the base and are resiliently biased upward relative to the base;
    at least two rollers rotatably connected to the respective at least two axle mounts; and
    wherein the carriage is configured to permit each roller to bear a vertical load and to move vertically and independently relative to each other roller.

2. The load adaptive roller carriage assembly in claim 1, further comprising at least two axles, wherein each axle is mounted to the carriage and rotatably supports a roller.

3. The load adaptive roller carriage assembly in claim 2, wherein the carriage and each axle are configured for snap fit of the axle into the carriage.

4. The load adaptive roller carriage assembly in claim 2, wherein the axles are releasably mounted to the carriage.

5. The load adaptive roller carriage assembly in claim 2, wherein the carriage further comprises a positive stop associated with each roller, wherein the positive stop limits downward movement of the respective roller.

6. The load adaptive roller carriage assembly in claim 1, wherein the carriage further comprises mounting members adapted to mount the carriage for engagement with a slide member of a slide assembly.

7. The load adaptive roller carriage assembly in claim 6, wherein the mounting members further comprise resilient arms.

8. The load adaptive roller carriage assembly in claim 6, wherein the mounting members and rollers are disposed in alignment along a common longitudinal axis.

9. The load adaptive roller carriage assembly in claim 1, wherein the carriage is configured to be evenhanded with respect to mounting to a slide member.

10. A load adaptive roller carriage assembly for use in providing auxiliary vertical support in a slide assembly that comprises a first slide member configured for mounting to a cabinet, a second slide member configured for mounting to a drawer and a third slide member configured for slidable movement between and with respect to the first and second slide members, the roller carriage assembly comprising:
    a carriage having a base and at least two axle mounts that extend vertically from the base and each axle mount is resiliently biased relative to the base;
    at least two rollers rotatably connected to the carriage and disposed below a second slide member; and
    the carriage configured to allow engagement of the rollers with the second slide member and independent vertical displacement of each roller depending on the vertical load carried by the second slide member relative to the first slide member.

11. The load adaptive roller carriage assembly in claim 10, wherein the carriage is mountable to a fixed surface.

12. The load adaptive roller carriage assembly in claim 11, wherein the carriage is configured to be mounted to a first slide member.

13. The load adaptive roller carriage assembly in claim 12, wherein the carriage further comprises resilient mounting members.

14. The load adaptive roller carriage assembly in claim 12, wherein the carriage further comprises mounting members that are disposed in alignment along a common longitudinal axis with the rollers.

15. The load adaptive roller carriage assembly in claim 10, wherein the carriage further comprises a base configured to be mounted to a first slide member.

16. The load adaptive roller carriage assembly in claim 15, wherein the carriage further comprises resilient mounting members that extend from the base.

17. The load adaptive roller carriage assembly in claim 10, wherein the each roller is rotatably mounted on an axle.

18. The load adaptive roller carriage assembly in claim 17, wherein each axle is mounted in the carriage.

19. The load adaptive roller carriage assembly in claim 18, wherein each axle is releasably mounted in the carriage.

20. The load adaptive roller carriage assembly in claim 10, wherein each roller is rotatably mounted on an axle, and each axle is connected to an axle mount.

21. A load adaptive roller carriage assembly for use in providing auxiliary vertical support to a slide member of a slide assembly, the load adaptive roller carriage assembly comprising:
- a carriage having a base and at least two axle mounts that extend vertically from the base;
- at least two rollers with each roller rotatably connected to an axle; each axle being connected to an axle mount;
- wherein the axle mounts are configured to be independently movable and resiliently biased upward relative to the base.

22. The load adaptive roller carriage assembly in claim 21, wherein each axle is releasably connected to an axle mount.

23. The load adaptive roller carriage assembly in claim 22, wherein downward movement of each roller is limited by a positive stop.

24. The load adaptive roller carriage assembly in claim 21, wherein the carriage further comprises resilient mounting members that extend from the base.

\* \* \* \* \*